US011604139B2

(12) United States Patent
Piccoli et al.

(10) Patent No.: US 11,604,139 B2
(45) Date of Patent: Mar. 14, 2023

(54) REAL-TIME MULTIDIMENSIONAL TERAHERTZ IMAGING SYSTEM AND METHOD

(71) Applicant: INSTITUT NATIONAL DE LA RECHERCHE SCIENTIFIQUE, Quebec (CA)

(72) Inventors: Riccardo Piccoli, Montreal (CA); Luca Razzari, Mont-Royal (CA); Luca Zanotto, Montreal (CA); Junliang Dong, Longueuil (CA); Roberto Morandotti, Montreal (CA)

(73) Assignee: INSTITUT NATIONAL DE LA RECHERCHE SCIENTIFIQUE, Quebec (CA)

( * ) Notice: Subject to any disclaimer, the term of this patent is extended or adjusted under 35 U.S.C. 154(b) by 286 days.

(21) Appl. No.: 17/060,479

(22) Filed: Oct. 1, 2020

(65) Prior Publication Data
US 2021/0096066 A1    Apr. 1, 2021

Related U.S. Application Data

(60) Provisional application No. 62/908,776, filed on Oct. 1, 2019.

(51) Int. Cl.
*G01N 21/3581* (2014.01)
*G01N 21/21* (2006.01)
*H04N 5/30* (2006.01)

(52) U.S. Cl.
CPC ......... *G01N 21/3581* (2013.01); *G01N 21/21* (2013.01); *H04N 5/30* (2013.01); *G01N 2201/0683* (2013.01); *G01N 2201/06113* (2013.01)

(58) Field of Classification Search
CPC .............. G01N 21/3581; G01N 21/21; G01N 2201/06113; G01N 2201/0683; H04N 5/30
See application file for complete search history.

(56) References Cited

U.S. PATENT DOCUMENTS

| 5,710,430 A | 1/1998 | Nuss |
| 6,111,416 A * | 8/2000 | Zhang ................ G01R 29/0885 324/96 |
| 7,119,339 B2 | 10/2006 | Ferguson et al. |

(Continued)

OTHER PUBLICATIONS

T. Hochrein, "Markets, availability, notice, and technical performance of terahertz systems: historic development, present, and trends", J. Infrared Millim. TE 36, 235 (2015).

(Continued)

*Primary Examiner* — David P Porta
*Assistant Examiner* — Fani Polyzos Boosalis
(74) *Attorney, Agent, or Firm* — Lavery, de Billy, LLP; Gwendoline Bruneau

(57) ABSTRACT

Real-time multidimensional terahertz imaging system and method, the method comprising method for imaging an object, comprising, in a laser pump line: patterning a laser pump beam with known patterns of a radiation beam and illuminating the object with the radiation beam; yielding a patterned pump beam; directing the patterned beam from the pump line and a laser probe beam from a laser probe line to a detection crystal; single-shot detection of the radiation beam waveform; and correlating the single-shot detection and the known patterns.

20 Claims, 7 Drawing Sheets

(56) References Cited

U.S. PATENT DOCUMENTS

| | | |
|---|---|---|
| 7,692,147 B2 | 4/2010 | Hu et al. |
| 7,767,968 B2 | 8/2010 | Youngner et al. |

OTHER PUBLICATIONS

D. M. Mittleman, "Twenty years of terahertz imaging", Opt. Express 26, 9417 (2018).
L. Zhao et al., "Advances in the biological effects of terahertz wave radiation", Mil. Med. Res. 1, 26 (2014).
L. Ho et al., "Terahertz spectroscopy: signatures and fingerprints", Nat. Photonics 2, 541 (2008).
S. L. Dexheimer (Ed.), Terahertz Spectroscopy: Principles and Applications, CRC Press 2007.
B. B. Hu and M. C. Nuss, "Imaging with terahertz waves", Opt. Lett. 20,16 (1995).
Q. Wu and X. C. Zhang, "Free-space electro-optic sampling of terahertz beams", Appl. Phys. Lett. 67, 3523 (1995).
M. Tani, et al., "Emission characteristics of photoconductive antennas based on low-temperature-grown GaAs and semi-insulating GaAs", Appl. Opt. 36, 7853 (1997).
M. P. Edgar et al., Principles and prospects for single-pixel imaging, Nature Photonics | vol. 13 | Jan. 2019 | 13-20, Springer Nature Limited 2018.
A. Stern (Ed.), Optical Compressive Imaging, CRC Press (2016).
W. L. Chan et al., "A single-pixel terahertz imaging system based on compressed sensing", Appl. Phys. Lett. 93, 121105 (2008).
P. Duan et al., "Single pixel imaging with tunable terahertz parametric oscillator", Appl. Opt. 55,13 (2016).
D. Shrekenhamer et al., "Terahertz single pixel imaging with an optically controlled dynamic spatial light modulator", Opt Express 21,10 (2013).
S. Busch et al., "Optically controlled terahertz beam steering and imaging", Opt. Lett. 37, 1391 (2012).
R. I. Stantchev et al., "Compressed sensing with near-field THz radiation", Optica 4, 8 (2017).
R. I. Stantchev et al., "Subwavelength hyperspectral THz studies of articular cartilage", Sci. Rep. 8, 6924 (2018).
C. M. Watts et al., "Terahertz compressive imaging with metamaterial spatial light modulators", Nat. Photonics 8, 605 (2014).
B. Sensale-Rodriguez et al., "Terahertz imaging employing graphene modulator arrays", Opt. Express 21, 2324 (2013).
A. W. Lee and Q. Hu, "Real-time, continuous-wave terahertz imaging by use of a microbolometer focal-plane array," Opt. Lett. 30, 2563 (2005).
Q. Wu et al., "Two-dimensional electro-optic imaging of THz beams", Appl. Phys. Lett. 69, 1026 (1996).
Z. Jiang and X.-C. Zhang, "Electro-optic measurement of THz field pulses with a chirped optical beam", Appl. Phys. Lett. 72, 1945 (1998).
Z. Jiang et al., "Single-shot spatiotemporal terahertz field imaging", Opt. Lett. 23,1114 (1998).
J. Shan et al., "Single-shot measurement of terahertz electromagnetic pulses by use of electro-optic sampling", Opt. Lett. 25, 426 (2000).
K. Y. Kim et al., "Single-shot terahertz pulse characterization via two-dimensional electro-optic imaging with dual echeions", Opt. Lett. 32, 1968 (2007).
J. P. Guillet et al., "Review of terahertz tomography techniques", J. Infrared Millim. TE 35, 382 (2014).
M. Bass et al. "Optical Rectification", Phys. Rev. Lett. 9, 446 (1962).
H. Hamster et al., "Subpicosecond, electromagnetic pulses from intense laser-plasma interaction", Phys. Rev. Lett. 71, 2725 (1993).
H. Hirori et al., "Single-cycle terahertz pulses with amplitudes exceeding 1 MV/cm generated by optical rectification in LiNb03", Appl. Phys. Lett. 98, 091106 (2011).
S. Keiber et al., "Electro-optic sampling of near-infrared waveforms", Nat. Photonics 10, 159 (2016).
X. Liu et al., "Exploiting total internal reflection geometry for efficient optical modulation of terahertz light", APL Photonics 1, 076103 (2016).
Y. Kawada et al., "Real-time measurement of temporal waveforms of a terahertz pulse using a probe pulse with a tilted pulse front", Opt. Lett. 33, 180, (2008).
L. Zanotto et al., "Time-domain terahertz compressive imaging", Optics Express, 28, 3795, (2020).

* cited by examiner

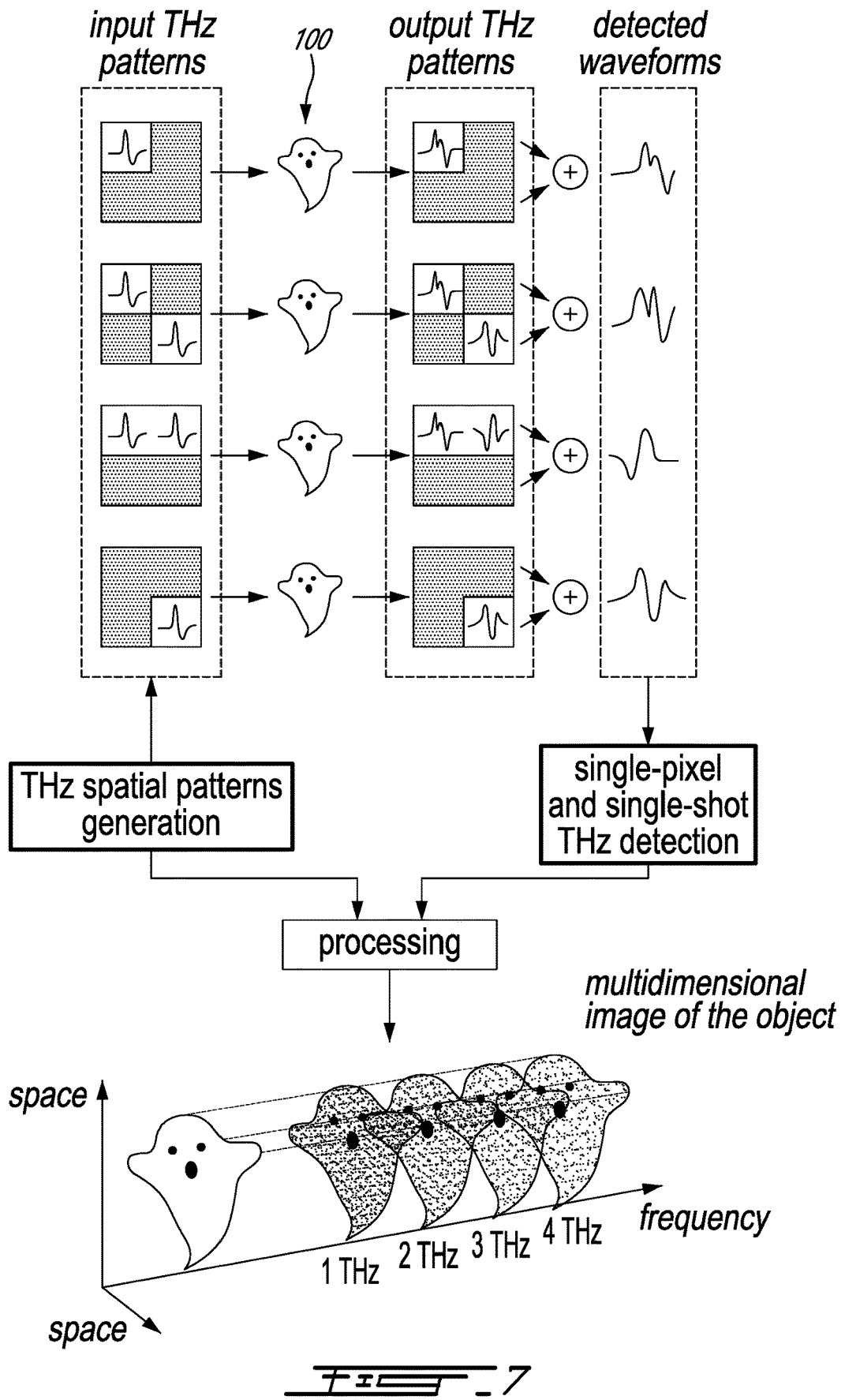

REAL-TIME MULTIDIMENSIONAL TERAHERTZ IMAGING SYSTEM AND METHOD

CROSS REFERENCE TO RELATED APPLICATIONS

This application claims benefit of U.S. provisional application Ser. No. 62/908,776 filed on Oct. 1, 2019. All documents above are incorporated herein in their entirety by reference.

FIELD OF THE INVENTION

The present invention relates to methods and systems for imaging object using electromagnetic radiations. More specifically, the present invention is concerned with a real-time multidimensional imaging system and method.

BACKGROUND OF THE INVENTION

Imaging technology using Terahertz (THz), electromagnetic waves of frequency in the range between 0.1 and 10 THz, has received considerable attention for industrial applications due to its ability to see through a wide range of materials such as plastic, paper, cardboard, semiconductor wafers, and fabrics, for example. In turn, this enables material quality test such as tests of homogeneity, stress cracks, inclusions and voids for example [1,2]. Moreover, unlike X-rays, THz photons have low energy, in the range of meV instead of the range of keV, and thus do not cause deleterious effects in sensitive materials and biological tissues [3]. Moreover, THz imaging allows spectroscopic identification of materials of the range of chemical compounds which spectrum are situated in this region [4]. Consequently, THz imaging presents a high potential for the non-destructive and non-contact testing of materials in the industry.

Currently, the most widely employed THz multidimensional imaging methods, where a multidimensional image refers to an image containing the spatial coordinates of the object, as well as time/frequency information, rely on time-domain spectroscopy (TDS), which provides coherent detection, i.e. retrieving amplitude and phase, of broadband THz electric field waveforms [5].

A number of challenges still hampers the industrial use of THz time-domain spectroscopy-based imaging systems. Indeed, time-domain spectroscopy requires a complete scan of a THz beam across the target to be imaged, either by mechanically displacing the beam or the target object, which may be unpractical in case of large target objects, or not robust and fast enough for industrial applications, and results in long acquisition times, typically spanning several hours, required to scan the entire target object pixel-by-pixel, by raster-scan method for instance. Moreover, a delay line is required to retrieve the temporal information, by sampling and reconstructing point-by-point in time the THz electric field waveform. Therefore, the possibility of realizing a multidimensional image at THz frequencies requires very long times, typically up to several hours depending on the image size and the spatial/temporal resolution needed.

More precisely, THz multidimensional imaging was introduced in 1995 [6] and typically the image at THz frequencies is obtained by scanning, pixel-by-pixel, in the horizontal and vertical directions, the object across the THz beam by means of motorized translation stages, while the THz electric field waveform is recorded in time, for each pixel, via electro-optic sampling (EOS) in non-centrosymmetric materials [7] or photoconductive antennas (PCAs) [8]. Regardless of the method used for coherent detection, a motorized delay line is needed to vary the delay between the THz waveform to be retrieved and an ultrashort optical probe pulse. To fully reconstruct the multidimensional image of the object, an entire scan of the delay line is required for each pixel of the object, and therefore the acquisition time increases exponentially with the image dimension, since an image of N-by-N pixels requires a total of $N^2$ scans of the delay line.

Therefore, the possibility of achieving real-time operation relies on improving simultaneously the spatial and temporal acquisition of the THz electric field. Regarding spatial acquisition of the THz electric field, a number of methods based on "single-pixel" imaging [9] have been introduced in recent years. Single-pixel imaging generally relies on illuminating the object with a plurality of spatial light patterns and measuring, for each pattern, the total transmitted power with a single-pixel detector. Neither the knowledge of the patterns nor the measurement by the single-pixel detector alone produces the image of the object, but only their correlation. Single-pixel imaging allows the indirect reconstruction of the object using only a single-pixel detector, thus with no spatial resolution. Compressive imaging [10] methods may be applied to reconstruct an image of N-by-N pixels using only a number M of measurements smaller than $N^2$. Such methods were applied in the THz domain using THz intensity patterns generated with methods such as using copper tape on a transparent plastic plate [11], metallic mask [12], semiconductor spatial light modulators [13-16], metamaterial-based spatial light modulator [17], and graphene [18] for example. Regardless of the method for THz pattern generation, the single-pixel detector is either a Golay cell, a bolometer, or a broadband Schottky diode to measure the transmitted THz power, or EOS [7] and PCAs [8] used as intensity detectors, thus conceptually equivalent to a bolometer, to record the THz peak electric field value.

Although THz cameras may be also directly used [19] to achieve real-time operation, THz cameras do not allow to retrieve spectral/temporal information, since each pixel is an intensity/energy detector. Instead, spectral/temporal information may be achieved in real-time by combining EOS with a fast charge-coupled device (CCD) camera [20]. Yet, the THz electric field waveform in each pixel may be acquired only by using a delay line.

EOS measurement by means of chirped optical probe pulses [21,22] or a probe beam with a tilted pulse front has been introduced [23] in view of overcoming the need of the delay line and "instantaneously" acquire the whole waveform of a THz pulse, also known as "single-shot" acquisition. Briefly, the first method encodes the temporal THz waveform on the frequency content of the probe pulses while the second encodes the temporal THz waveform on the spatial profile of the probe pulses. These methods are referred to herein as "frequency-domain single-shot" detection and "spatial-domain single-shot" detection, respectively. Other single-shot methods are based on imprinting the THz waveform directly on the transversal profile of an unchirped optical probe beam, meaning that all the spectral components of the optical probe beam arrive at the same time, with no pulse front tilt [24], and on two-dimensional electro-optic imaging with dual echelon optics [25].

Imaging methods such as THz diffraction or time-of-flight tomography are complex and research-only-methods aiming at reconstructing 3D THz images [26].

Thus, available THz imaging methods capable of retrieving spectral/temporal information of an object still require scanning the object across the THz beam and/or a delay line to acquire the THz waveform in time. Systems based on single-pixel imaging typically make use of a bolometer or an equivalent energy detector to detect the energy of the THz wave transmitted through or reflected by the object. Although such systems may operate without any moving mechanical part, they cannot extract spectral/temporal information from the object under investigation. Recent works [15] substituted the energy-sensitive detector with an electric-field-sensitive detection stage based on EOS to retrieve the THz waveform in time. Very recently, complete retrieval of spectral/temporal information was demonstrated [27], yet employing a delay line. Although fast delay lines are available to speed up the systems, they may hardly go above 20 scans/s and are still limited to short scan ranges of the order of about ten picoseconds. Moreover, they require expensive electronic detection devices such as high modulation frequency square wave generators, in case of photoconductive antennas (PCAs) used for THz generation, analog-to-digital converters with high sampling rates and lock-in amplifiers. Therefore, available systems are still bulky, unstable, noisy, expensive, and slow.

There is still a need in the art for a real-time multidimensional imaging system and method.

SUMMARY OF THE INVENTION

More specifically, in accordance with the present invention, there is provided a system for imaging an object, comprising: a laser source; a beam splitter, dividing pulses emitted by the laser source into a pump beam in a pump line and a probe beam in a probe line; in the pump line, a generator of a radiation beam; a pattern generator modulating the radiation beam in at least one of: amplitude and phase by preset patterns into a patterned radiation beam; and the object; a focusing unit; a detection crystal; the focusing unit focusing a patterned pump beam from the pump line and the probe beam from the probe line to the detection crystal; the probe beam sampling in the detection crystal different points in time of the radiation beam electric field waveform, each probe pulse spectral component or point along a spatial profile of the probe beam changing a polarization state thereof as a function of the strength of the radiation beam electric field; a linear polarizer; the linear polarizer translating the changes in the polarization state into an intensity modulation of the probe beam; a detector, the detector reading the intensity modulation of the probe beam in real-time; and a processing unit reconstructing an image of the object from the preset patterns and corresponding readings at the detector.

There is further provided a method for imaging an object, comprising, in a laser pump line: patterning a laser pump beam with known patterns of a radiation beam and illuminating the object with the radiation beam; yielding a patterned pump beam; directing the patterned beam from the pump line and a laser probe beam from a laser probe line to a detection crystal; single-shot detection of the radiation beam waveform; and correlating the single-shot detection and the known patterns.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 7 is a schematic view of a THz imaging method based on single-pixel imaging and single-shot detection according to an embodiment of an aspect of the present disclosure.

DESCRIPTION OF ILLUSTRATIVE EMBODIMENTS

The present invention is illustrated in further details by the following non-limiting examples.

Figure 1A:
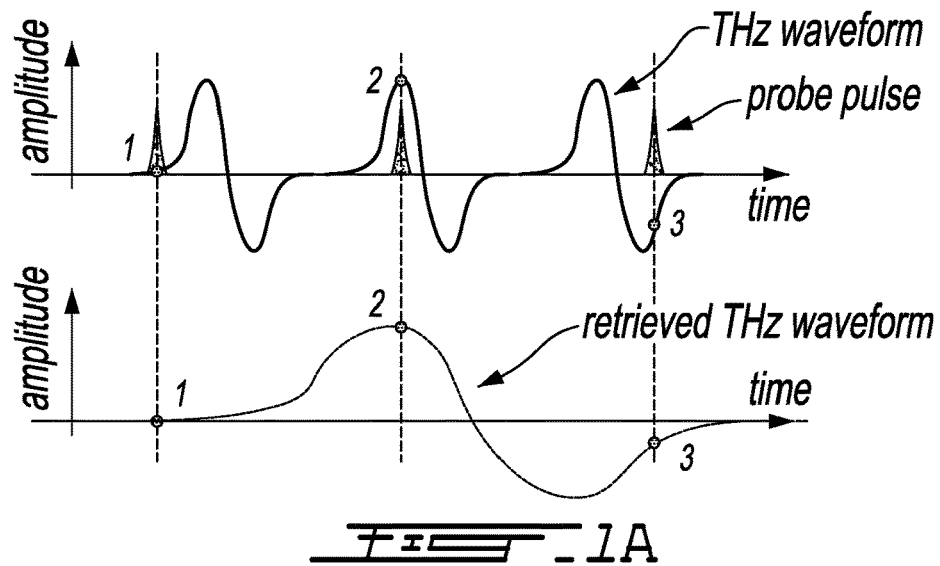
FIG. 1A is a schematic view of electro-optic sampling (EOS) principle of operation.

In standard EOS, an unchirped optical probe, i.e. a transform-limited optical probe pulse, is delayed in time to sample different points 1, 2, 3 of the THz electric field waveform in an electro-optic crystal (EOC). In each of the sampled points, the polarization state of the probe pulse changes depending on the strength of the THz electric field. A balanced detection stage is used to record these changes of the polarization state of the probe pulse and reconstruct the whole THz electric field waveform point-by-point in time, as schematically illustrated in FIG. 1A (bottom curve of FIG. 1A).

Figure 1B:
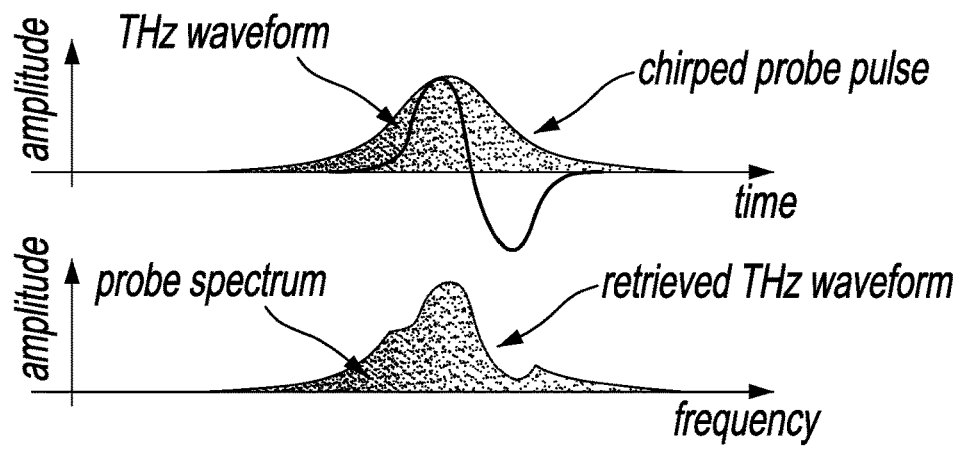
FIG. 1B is a schematic view of frequency-domain single-shot detection principle of operation.

In the frequency-domain single-shot detection method, a chirped optical probe pulse whose spectral components are delayed in time, overlaps the entire THz waveform (see FIG. 1B, top panel, solid line) in the electro-optic crystal (EOC). After passing through a polarizer, the THz waveform results directly encoded in the amplitude of the probe pulse spectrum (bottom panel of FIG. 1B). This spectrum, containing the whole THz electric field waveform, can be read by a real-time spectrometer. Thus, the THz waveform is instantaneously retrieved in time, overcoming the need of the point-by-point sampling in time of the THz electric field waveform.

Figure 1C:
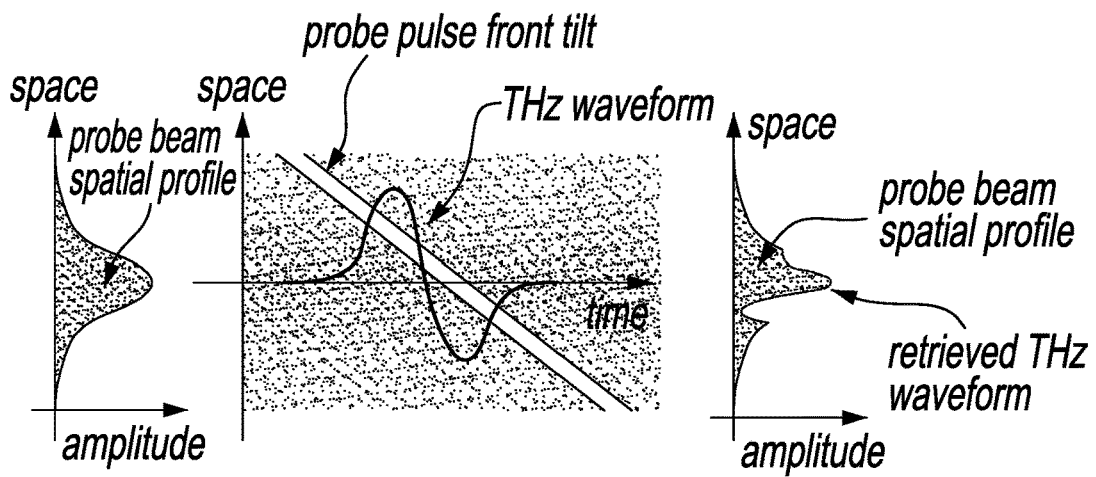
FIG. 1C is a schematic view of spatial-domain single-shot detection principle of operation.

The spatial-domain single-shot detection method can also be used to instantaneously retrieve the THz waveform in time, without point-by-point sampling in time of the THz electric field waveform. A probe beam featuring a tilted pulse front, in which different points along the beam profile are delayed in time as schematically illustrated by the diagonal lines, overlaps the entire THz waveform (see FIG. 1C central panel) in the detection EOC. After passing through a polarizer, the THz waveform results directly encoded in the amplitude of the probe pulse beam profile (FIG. 1C right panel), and the beam profile containing the whole THz electric field waveform can be read by a photodiode array or a charge-coupled device (CCD).

Figure 2A:
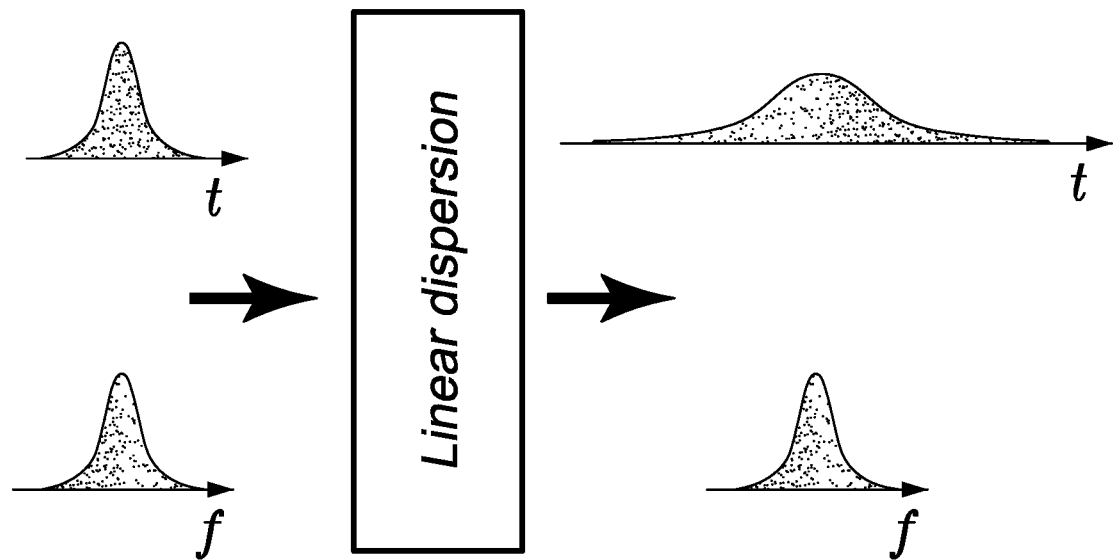
FIG. 2A is a schematic view of linear dispersion.
Figure 2B:
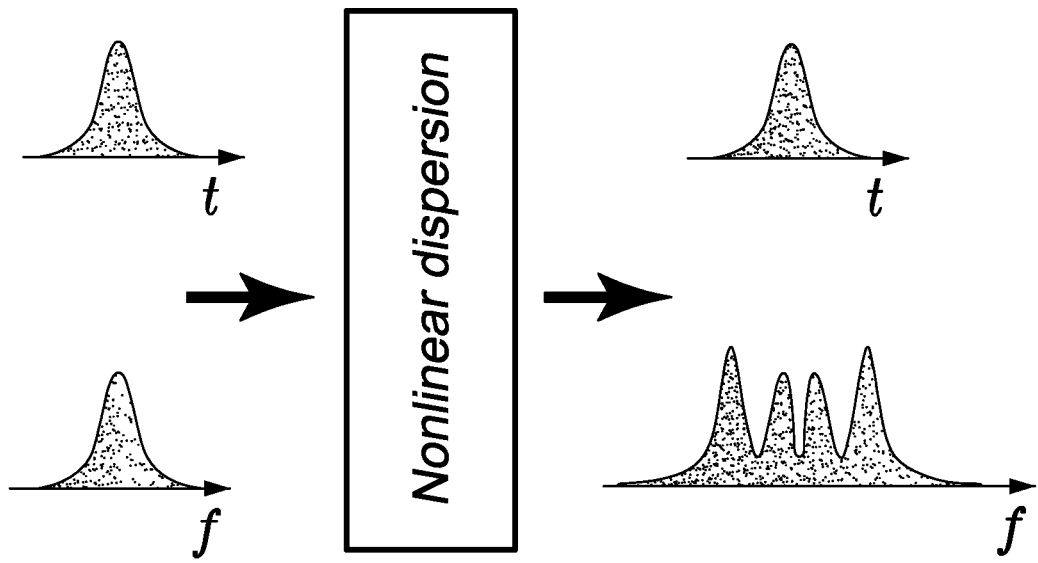
FIG. 2B is a schematic view of nonlinear dispersion.

FIG. 2 schematically show linear (FIG. 2A) and nonlinear (FIG. 2B) dispersion of an input optical probe pulse, in time (t) and frequency (f). Regarding the reconstruction of the THz waveform, the limit in temporal/spectral resolution of standard frequency-domain single-shot method based on imposing a linear chirp over the probe pulses (FIG. 2A) can be overcome by imposing a nonlinearly-induced chirp by spectral broadening of the probe pulses in third-order nonlinear media, which is referred to as nonlinear dispersion, as shown in FIG. 2B. On the left-hand side, the temporal (t) and spectral (f) profiles of the unchirped, i.e., transform-limited optical probe pulses are shown as emitted by a laser source. On the right-handside, the temporal (t) and spectral (f) profiles of the probe pulse are shown after propagation through a dispersive unit. As shown in FIG. 2A, linear dispersion results in a longer pulse in time without adding spectral components to the pulse spectrum. Conversely, nonlinear dispersion adds new spectral components, i.e. frequencies, to the pulse spectrum, while leaving unaltered its temporal duration, as illustrated in FIG. 2B. In both cases, the spectral components arrive at different times, which is used to perform frequency-domain single-shot measurements.

Imaging systems and methods according to the present disclosure combine single-pixel imaging and single-shot detection for retrieving real-time multidimensional images in a wide frequency range, at THz frequencies and up to infrareds frequencies, in absence of moving parts such as motorized delay lines and translation stages for example, or expensive electronic devices such as lock-in amplifiers for example.

Figure 3A:
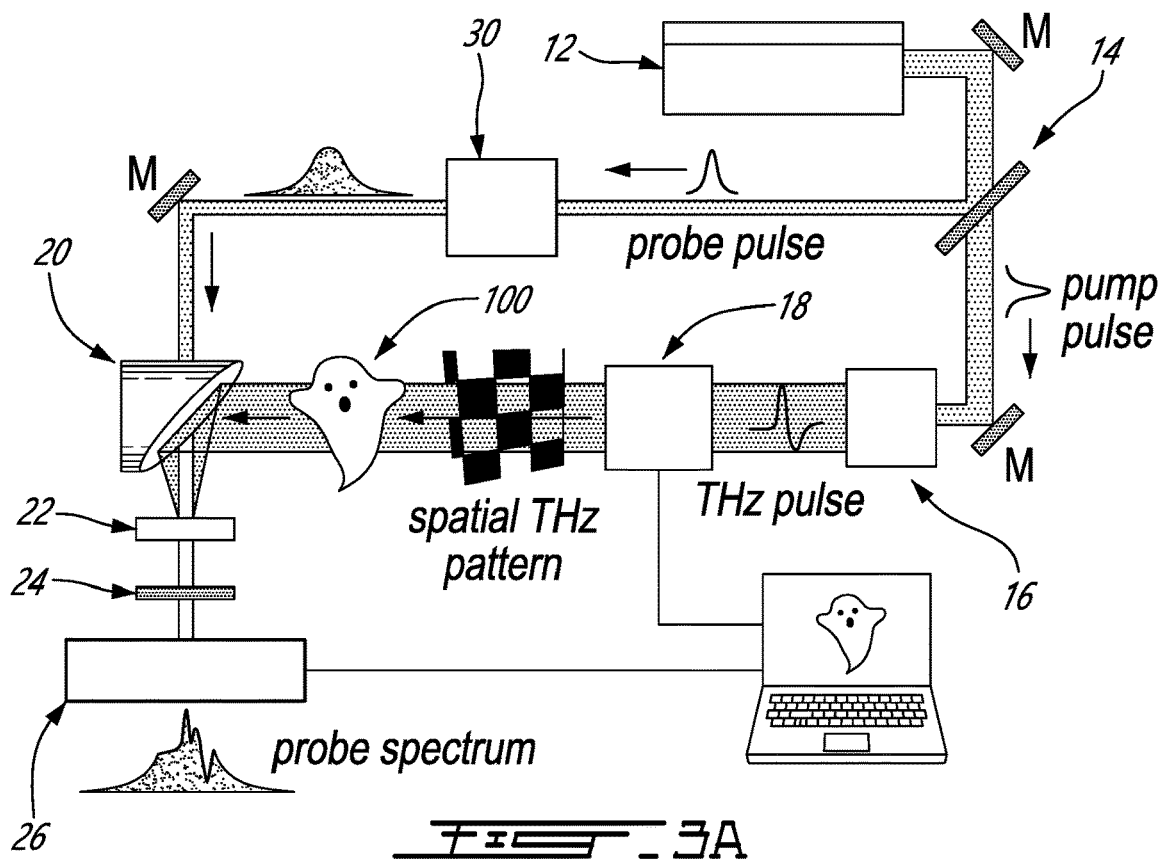
FIG. 3A is a schematic view of a real-time multidimensional THz imaging system based on single-pixel imaging and frequency-domain single-shot detection according to an embodiment of an aspect of the present disclosure.
Figure 3B:
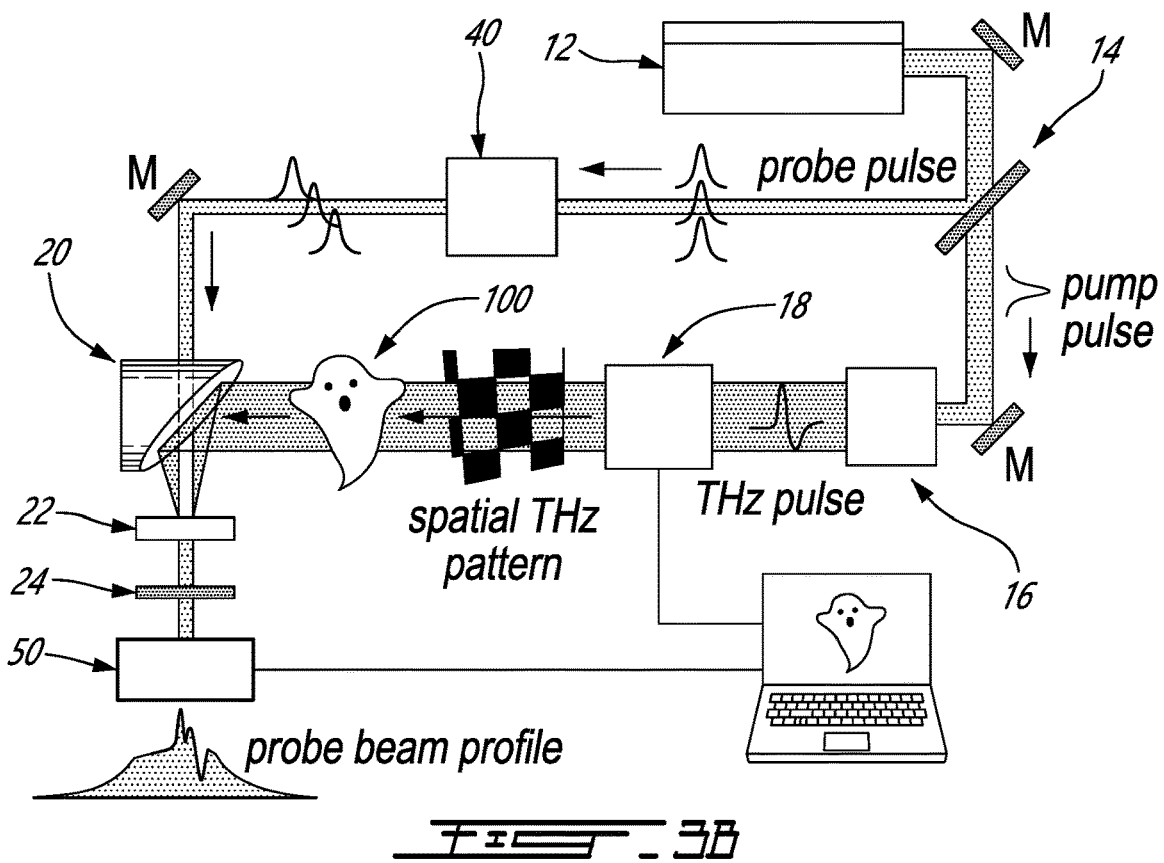
FIG. 3B is a schematic view of a real-time multidimensional THz imaging system based on single-pixel imaging and spatial-domain single-shot detection according to an embodiment of an aspect of the present disclosure.

FIG. 3A shows a real-time multidimensional THz imaging system comprising single-pixel imaging and frequency-domain single-shot detection according to an embodiment of an aspect of the present disclosure and FIG. 3B shows a real-time multidimensional THz imaging system comprising single-pixel imaging and spatial-domain single-shot detection according to an embodiment of an aspect of the present disclosure. For simplicity, the systems are illustrated and described in transmission herein although they may operate in reflection mode. M stands for mirrors.

Optical pulses emitted by a laser source 12 are divided into a pump beam and a probe beam by a beam splitter 14.

The laser source 12 may be an oscillator emitting pulses of energies in the range between about 0.1 and about 100 nJ, for a high-repetition-rates and high signal-to-noise ratios imaging system. The laser source 12 may be an amplified laser system emitting pulses of energies in the range between about 1 µJ and about 10 mJ, for high-energy imaging system. The laser source 12 may be a Ti:sapphire, Yb-, Nd-, Tm-, Er-based laser system based on bulk-, thin-disks-, fibers-, or slab-based units for example. To obtain broadband THz pulses as illustrated in the examples described herein, the laser source 12 is selected to emit pulses of sub-picosecond durations.

In the pump line, radiation pulses are generated by a radiation generator 16.

In the illustrated case of a THz generator, the radiation generator 16 generates THz broadband pulses, by optical rectification (OR) in second-order non-centrosymmetric media [28], plasma generation [29], or PCAs [8], for example, depending on the application. For instance, OR in lithium niobate [30] or in organic crystals may be used if a high-energy imaging system is required. Plasma generation for ultra-broadband operation above 5 THz for example, or PCAs, may be used for low-power, high-repetition-rate and high signal-to-noise ratio (SNR) imaging systems.

The system operates at frequencies higher than 10 THz, up to 230 THz, since EOS can be performed in this frequency range [31]. The radiation generator 16 is then selected to generate pulses of frequencies higher than 10 THz, in the infrared range, for imaging at frequencies higher than 10 THz; it may be an optical parametric amplifier (OPA) or an optical parametric oscillator (OPO) for example.

The transversal spatial distribution of the radiation beam is modulated in amplitude and/or phase, before as illustrated, or after, illuminating the object 100 to be imaged, by a pattern generator 18.

Figure 4:
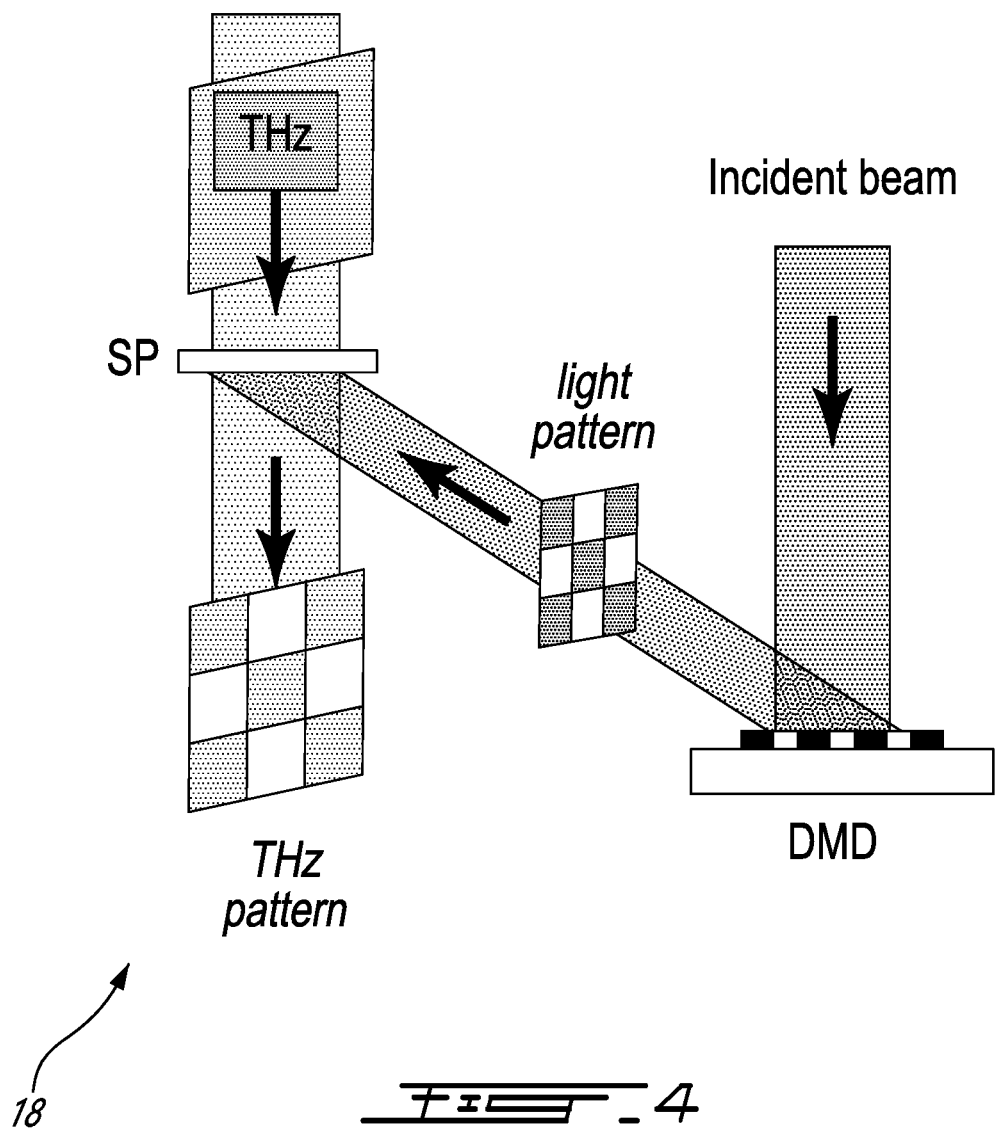
FIG. 4 is a schematic view of a THz pattern generator according to an embodiment of an aspect of the present disclosure.

The pattern generator 18 imposes preset, known patterns to the radiation beam. The pattern generator 18 may comprise a spatial light modulator (SLM) and a semiconductor plate such as a silicon wafer for example, as illustrated in FIG. 4. FIG. 4 shows a digital-micromirror-device (DMD) imposing a light pattern on an incident laser visible or near-infrared beam; the resulting light pattern is imaged on a semiconductor plate (SP), where it locally excites carriers. A THz beam (THz), by passing through the semiconductor plate (SP), is patterned, i.e., modulated in amplitude, in the same way. In the systems of FIG. 3, the incident laser beam may be a portion of the pump beam itself. A digital-micromirror-device (DMD) may be used to modulate the spatial profile of this portion of the pump beam; the resulting laser light pattern is then imaged on a semiconductor plate (SP); patterned laser light exciting carriers in the semiconductor conduction band of the semiconductor plate (SP). The semiconductor plate (SP) acting as a mirror for THz radiation generated by the radiation generator 16 in the excited regions, the light pattern translated into a carrier pattern into the semiconductor plate (SP) is transferred to the THz radiation passing through: the THz beam spatial profile is modulated in amplitude in the same way the laser light projected onto the semiconductor plate (SP) is modulated in amplitude.

A spatial-light-modulator (SLM) may be used to directly modulate in amplitude and/or phase the pump beam before impinging onto the THz generator 16, so that THz patterns can be directly generated via optical rectification (OR) in the THz generation crystal of the THz generator 16.

Efficient all-optical THz spatial modulation may be achieved using total internal reflection [32]. Spatial modulation of the THz beam may also be achieved using polymers, graphene, or liquid crystals for example.

For single-shot detection, the generated THz patterns, transmitted through or reflected off the object 100 to be imaged, and the chirped probe pulse (FIG. 3A) or the pulse front tilted probe beam (FIG. 3B) are concentrated onto the detection EOC crystal 22 by a focusing unit 20.

Figure 5A:
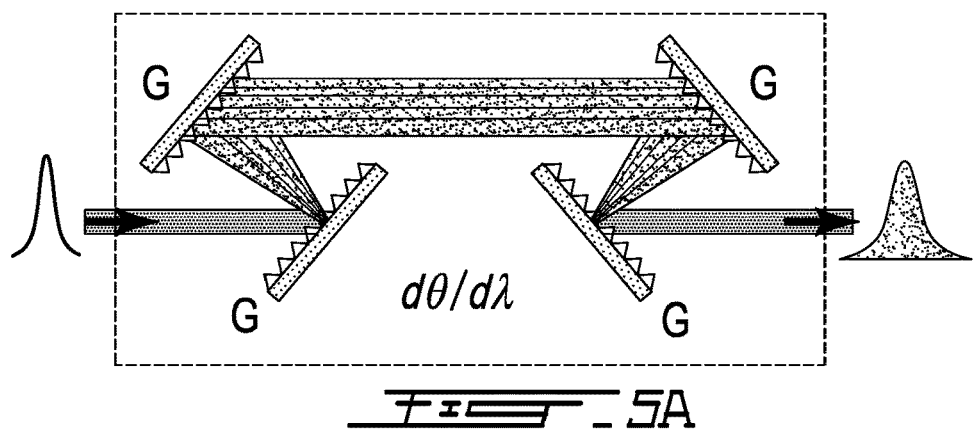
FIG. 5A is a schematic view of a dispersive unit based on linear dispersion according to an embodiment of an aspect of the present disclosure.
Figure 5B:
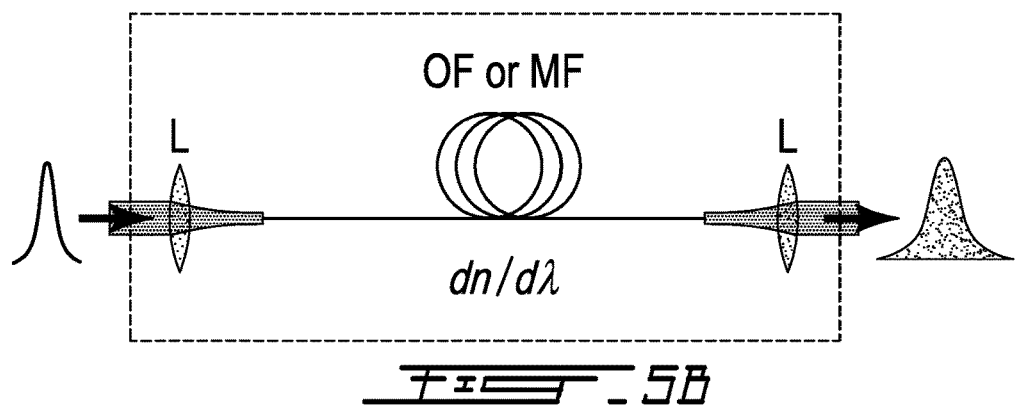
FIG. 5B is a schematic view of a dispersive unit (based on linear dispersion according to an embodiment of an aspect of the present disclosure.

For frequency-domain single-shot detection, in the probe line a dispersive unit 30 spreads the probe beam spectral components in time before the probe beam reaches the detection crystal 22. The dispersive unit 30 may be based on linear dispersion, thus without generating new spectral components in the probe beam (FIG. 2A, FIGS. 5A and 5B), or on nonlinear dispersion, resulting in new spectral components in the probe beam (FIG. 2B and FIG. 6). Linear dispersion may be implemented by exploiting the angular dispersion ($d\theta/d\lambda$) of dispersive optics such as diffraction grating (G) pairs (FIG. 5A) or the chromatic dispersion of the refractive index of a material ($dn/d\lambda$) such as glass in an optical fiber (OF) or a selectively engineered chromatic dispersion in a microstructured fiber (MF) (FIG. 5B; L is a focusing/defocusing optics) for example.

Figure 5C:
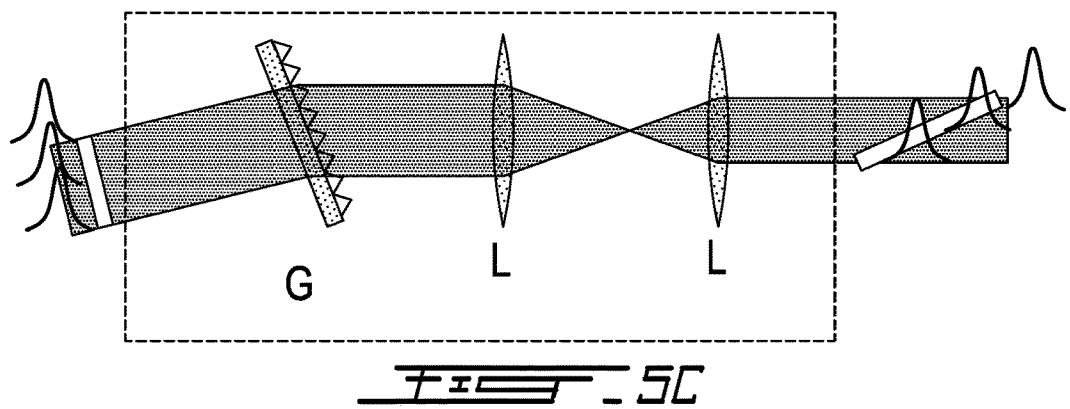
FIG. 5C is a schematic view of a tilting device based on angular dispersion according to an embodiment of an aspect of the present disclosure.
Figure 5D:
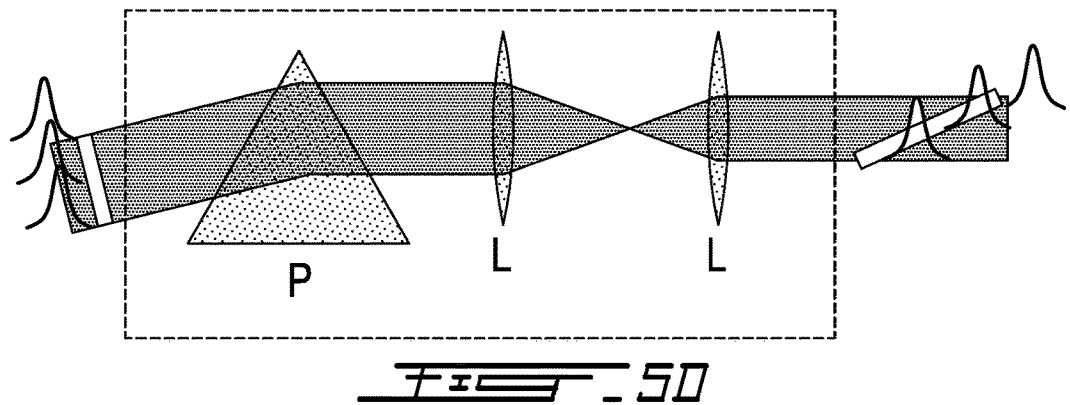
FIG. 5D is a schematic view of a tilting device based on angular dispersion according to an embodiment of an aspect of the present disclosure.

Spatial-domain single-shot detection comprises imposing a time delay between different points of the spatial profile of the probe beam, technically called pulse front tilt, before reaching the detection crystal 22. As shown in FIG. 3B, a tilting device 40 in the probe line induces such a tilt or pulse front chirp between the probe pulse front and a direction perpendicular to the probe beam propagation. The tilting device 40 may be based on angular dispersion of a diffraction grating (G) (FIG. 5C), or a prism (FIG. 5D; L is a focusing/defocusing optics) for example.

The probe pulse, dispersed in time (FIG. 1B) or with the front tilted in space (FIG. 1C) over a temporal window at least covering the entire duration of the THz waveform, is focused into the detection crystal 22 together with the patterned beam from the pump line (see FIGS. 3A and 3B). Since the spectral components (FIG. 1B and FIG. 3A) or the points along the spatial profile (FIG. 1C and FIG. 3B) of the probe pulse arrive at different times in the detection crystal 22, they sample in the detection crystal 22 different points in time of the THz electric field waveform. Due to the electro-optic effect known as the Pockels effect, each probe pulse spectral component or point along the spatial profile changes its polarization state according to the strength of the THz electric field.

The focusing unit 20 may be a focusing mirror, a lens, or a combination of lenses, as illustrated for example in FIGS. 3A and 3B, and the detection EOC crystal 22 may be zinc telluride or gallium phosphide, for example.

A linear polarizer 24 translates this change in the polarization state into an intensity modulation of the probe spectrum or spatial profile of the probe beam. A spectrometer 26 reads the probe beam spectrum in real-time in the case of frequency-domain single-shot detection, as presented in FIG. 3A, and, in the case of spatial-domain single-shot detection illustrated in FIG. 3B, a detector array 50 such as a charge-coupled device (CCD), reads the probe beam spatial profile in real-time.

The THz electric field waveform is thus encoded in the amplitude of the spectral components (FIG. 3A) or of the spatial profile of the probe pulse (FIG. 3B), which is read in a "single-shot" without the need of a delay line (see the difference between standard EOS and single-shot detection in FIG. 1).

Temporal resolution in case of linear dispersion (FIG. 2A) used for temporal dispersion of the spectral components of the probe pulse in frequency-domain single-shot detection, may be limited, due to an intrinsic property of the laser system, related to the time-bandwidth product of the laser pulses. Indeed temporal resolution is equal to the square root of the product of the original probe pulse duration and the chirped pulse duration. A method according to an embodiment of an aspect of the present disclosure comprises using nonlinear dispersion (FIG. 2B and FIG. 6) to generate new probe spectral components. The method comprises propagating the probe pulses through a third-order nonlinear medium, yielding new probe spectral components in a self-phase modulation process associated with the electronic instantaneous nonlinear (Kerr) response of the medium, which simultaneously broadens the spectrum of the pulses symmetrically in frequency (fin FIG. 2B) and induces over a large central region of the pulses a positive chirp in time similar, but opposite in sign, to the chirp induced by a grating pair.

Figure 6A:
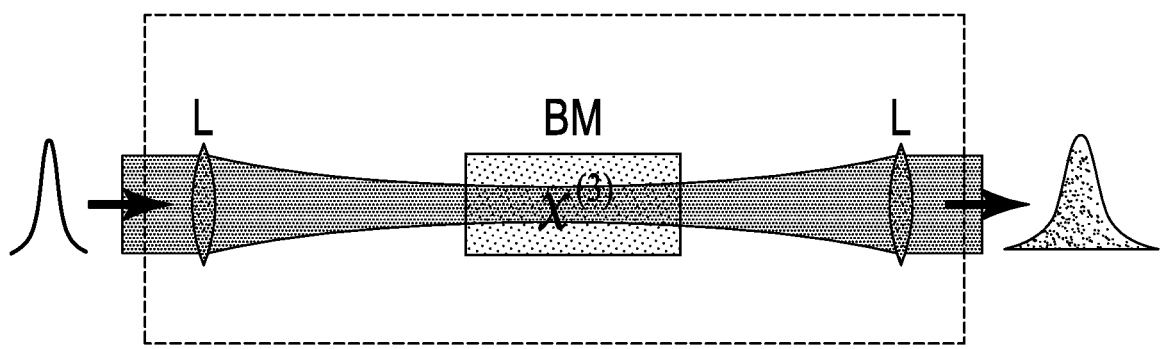
FIG. 6A is a schematic view of a dispersive unit based on nonlinear dispersion according to an embodiment of an aspect of the present disclosure.
Figure 6B:
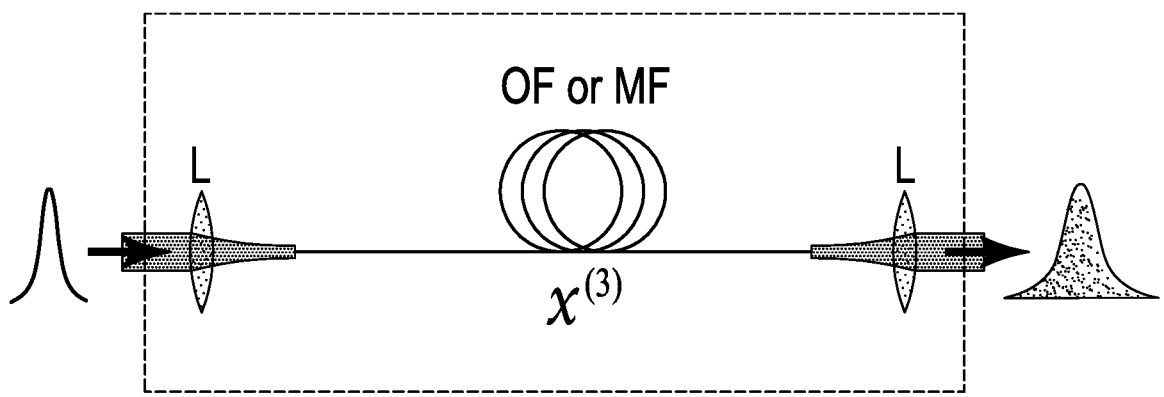
FIG. 6B is a schematic view of a dispersive unit based on nonlinear dispersion according to an embodiment of an aspect of the present disclosure.
Figure 6C:
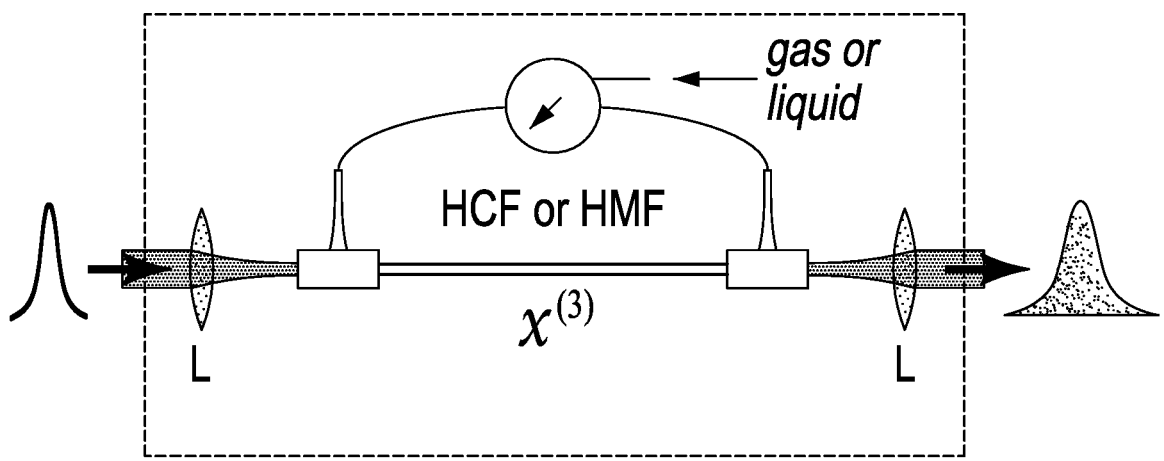
FIG. 6C is a schematic view of a dispersive unit based on nonlinear dispersion according to an embodiment of an aspect of the present disclosure.

This nonlinearly-induced chirp may be obtained in many different ways depending on the laser source 12. As illustrated in FIG. 6, the probe pulses may propagate through a bulk medium (BM) such as silica, sapphire, calcium fluoride etc. (see FIG. 6A); in a glass optical fiber (OF) or a microstructured fiber (MF) (FIG. 6B); in a gas-/liquid-filled hollow-core-fiber (HCF) or in a gas-/liquid-filled hollow microstructured fiber (HMF) (FIG. 6C), so that the time-bandwidth limitation intrinsic from the laser source is overcome. This nonlinear approach may be also combined with the linear approach to independently control the temporal and spectral broadening of the probe pulse, corresponding to the temporal window and resolution desired for the detection of the THz waveforms, respectively.

The THz waveform corresponding to each known pattern propagating through the object may be retrieved in an acquisition time in the range of a few milliseconds, only dependent on and limited by the speed of the electronic devices employed for frequency-domain or spatial-domain single-shot detection.

A spectral image may be reconstructed by correlating the THz waveform retrieved as described hereinabove with each THz pattern as known in the art for example. Imaging of the object is very fast, within a second, since no mechanical moving part is involved.

FIG. 7 illustrates a THz multidimensional imaging method according to an embodiment of an aspect of the present disclosure. From the left handside, four different known THz spatial patterns are used to illuminate the object 100. The temporal waveforms of the THz pulses in each pixel (output THz patterns) are different due to the local interaction with the object 100. The output THz patterns are focused into the detection crystal (not shown) together with the chirped probe pulses (for frequency-domain single-shot detection, FIG. 3A) or tilted probe pulses (for spatial-domain single-shot detection, FIG. 3B), and the resulting THz waveform is imprinted over the probe spectral (frequency-domain single-shot detection, FIG. 3A) or over the probe spatial profile (spatial-domain single-shot detection, FIG. 3B) respectively, which is then read in real-time by a spectrometer (frequency-domain single-shot detection, FIG. 3A) or a detector array (spatial-domain single-shot detection, FIG. 3B) respectively, as described hereinabove. The correlation between the retrieved THz waveforms and the THz patterns yields the multidimensional image of the object 100 at THz frequencies (pictures of the object 100 on the bottom panel of FIG. 7). The number of patterns required for image reconstruction is at most equivalent to the number of pixels of the image by imaging processing. The image of the object may be reconstructed with a decreased number of measurements, corresponding to the number of patterns, which in turns results in increased acquisition speed and increased SNR.

As people in the art will appreciate, there is thus presented a system and a method for reconstructing THz images of an object in time and space in absence of motorized delay lines and translation stages, by the combination of single-pixel imaging with single-shot detection, either in the frequency-domain or in the spatial-domain, to instantaneous record the whole THz waveform.

No motorized translation stages are required to scan the entire object pixel-by-pixel across the THz beam. THz patterns illuminating the object may be realized at a fast rate with electronic devices such as electronic devices used in digital projectors, for example digital-micromirror-devices (DMD).

The THz multidimensional image of the object is then produced in real-time by correlating the THz waveforms acquired by single-shot detection and corresponding known pattern distributions.

No expensive electronic devices such as lock-in amplifiers and fast analog-to-digital converters are required for detection or processing. Acquisition time is only limited by the repetition rate of the laser source and the electronic devices selected, since the method and system do not rely on mechanical parts.

A method and a system according to the present invention allow reconstructing multidimensional THz images of an object in absence of mechanical moving parts and sophisticated electronic devices typically required in standard THz time-domain spectroscopy methods and systems.

A method according to an embodiment of the present disclosure generally comprises single-pixel imaging and single-shot detection for time-domain THz waveform retrieval, real-time imaging in absence of moving parts, and nonlinearly-induced chirp for increased temporal/spectral resolution. Therefore, on one side, image acquisition may be extremely fast, within a second, only dependent on the repetition rate of the selected laser source and the speed of the selected electronics, thus enabling real-time operation. On the other side, a system implementing the method may be made very compact, robust and cost-effective, in view of manufacturing and commercialization. The method and system may also be extended to the infrared range.

There is presented a nonlinear dispersion method to chirp the probe pulses, which allows overcoming the THz frequency resolution/bandwidth trade-off set by standard linear dispersion methods.

The scope of the claims should not be limited by the embodiments set forth in the examples, but should be given the broadest interpretation consistent with the description as a whole.

REFERENCES

[1] T. Hochrein, "Markets, availability, notice, and technical performance of terahertz systems: historic development, present, and trends", J. Infrared Millim. TE 36, 235 (2015).
[2] D. M. Mittleman, "Twenty years of terahertz imaging", Opt. Express 26, 9417 (2018).
[3] L. Zhao et al., "Advances in the biological effects of terahertz wave radiation", Mil. Med. Res. 1, 26 (2014).
[4] L. Ho et al., "Terahertz spectroscopy: signatures and fingerprints", Nat. Photonics 2, 541 (2008).
[5] S. L. Dexheimer (Ed.), *Terahertz Spectroscopy: Principles and Applications*, CRC Press 2007.
[6] B. B. Hu and M. C. Muss, "Imaging with terahertz waves", Opt. Lett. 20, 16 (1995).
[7] Q. Wu and X. C. Zhang, "Free-space electro-optic sampling of terahertz beams", Appl. Phys. Lett. 67, 3523 (1995).
[8] M. Tani et al., "Emission characteristics of photoconductive antennas based on low-temperature-grown GaAs and semi-insulating GaAs", Appl. Opt. 36, 7853 (1997).
[9] M. P. Edgar et al., "Principles and prospects for single-pixel imaging," Nat. Photonics 13, 13 (2019).
[10] A. Stern (Ed.), *Optical Compressive Imaging*, CRC Press (2016).
[11] W. L. Chan et al., "A single-pixel terahertz imaging system based on compressed sensing", Appl. Phys. Lett. 93, 121105 (2008).
[12] P. Duan et al., "Single pixel imaging with tunable terahertz parametric oscillator", Appl. Opt. 55, 13 (2016).
[13] D. Shrekenhamer et al., "Terahertz single pixel imaging with an optically controlled dynamic spatial light modulator", Opt. Express 21, 10 (2013).
[14] S. Busch et al., "Optically controlled terahertz beam steering and imaging," Opt. Lett. 37, 1391 (2012).
[15] R. I. Stantchev et al., "Compressed sensing with near-field THz radiation", Optica 4, 8 (2017).
[16] R. I. Stantchev et al., "Subwavelength hyperspectral THz studies of articular cartilage", Sci. Rep. 8, 6924 (2018).
[17] C. M. Watts et al., "Terahertz compressive imaging with metamaterial spatial light modulators", Nat. Photonics 8, 605 (2014).
[18] B. Sensale-Rodriguez et al., "Terahertz imaging employing graphene modulator arrays", Opt. Express 21, 2324 (2013).
[19] A. W. Lee and Q. Hu, "Real-time, continuous-wave terahertz imaging by use of a microbolometer focal-plane array," Opt. Lett. 30, 2563 (2005).
[20] Q. Wu et al., "Two-dimensional electro-optic imaging of THz beams", Appl. Phys. Lett. 69, 1026 (1996).
[21] Z. Jiang and X.-C. Zhang, "Electro-optic measurement of THz field pulses with a chirped optical beam", Appl. Phys. Lett. 72, 1945 (1998).
[22] Z. Jiang et al., "Single-shot spatiotemporal terahertz field imaging", Opt. Lett. 23, 1114 (1998).
[23] Y. Kawada et al., "Real-time measurement of temporal waveforms of a terahertz pulse using a probe pulse with a tilted pulse front", Opt. Lett. 33, 180 (2008).
[24] J. Shan et al., "Single-shot measurement of terahertz electromagnetic pulses by use of electro-optic sampling", Opt. Lett. 25, 426 (2000).
[25] K. Y. Kim et al., "Single-shot terahertz pulse characterization via two-dimensional electro-optic imaging with dual echelons", Opt. Lett. 32, 1968 (2007).
[26] J. P. Guillet et al., "Review of terahertz tomography methods", J. Infrared Millim. TE 35, 382 (2014).
[27] L. Zanotto et al., "Time-domain terahertz compressive imaging", Opt. Express 28, 3795 (2020).
[28] M. Bass et al., "Optical Rectification", Phys. Rev. Lett. 9, 446 (1962).
[29] H. Hamster et al., "Subpicosecond, electromagnetic pulses from intense laser-plasma interaction", Phys. Rev. Lett. 71, 2725 (1993).
[30] H. Hirori et al., "Single-cycle terahertz pulses with amplitudes exceeding 1 MV/cm generated by optical rectification in LiNbO3", Appl. Phys. Lett. 98, 091106 (2011).
[31] S. Keiber et al., "Electro-optic sampling of near-infrared waveforms", Nat. Photonics 10, 159 (2016).

[32] X. Liu et al., "Exploiting total internal reflection geometry for efficient optical modulation of terahertz light", APL Photonics 1, 076103 (2016).

The invention claimed is:

1. A system for imaging an object, comprising:
a laser source;
a beam splitter, dividing pulses emitted by the laser source into a pump beam in a pump line and a probe beam in a probe line;
in the pump line, a generator of a radiation beam; a pattern generator modulating the radiation beam in at least one of: amplitude and phase by preset patterns into a patterned radiation beam; and the object;
a focusing optics;
a detection crystal; said focusing optics focusing a patterned pump beam from said pump line and the probe beam from said probe line to said detection crystal; the probe beam sampling in said detection crystal different points in time of the radiation beam electric field waveform, each probe pulse spectral component or point along a spatial profile of the probe beam changing a polarization state thereof as a function of the strength of the radiation beam electric field;
a linear polarizer; said linear polarizer translating the changes in the polarization state into an intensity modulation of the probe beam;
a detector, said detector reading the intensity modulation of the probe beam in real-time; and
a computer reconstructing an image of the object from the preset patterns and corresponding readings at said detector.

2. The system of claim 1, wherein the system comprises optics selected for spreading spectral components of the probe beam in time over a temporal window at least covering the entire duration of the radiation beam waveform; said linear polarizer translating the changes in the polarization state into intensity modulation of the probe beam spectrum and said detector is a real-time spectrometer.

3. The system of claim 1, comprising in the probe line optics selected for nonlinear temporal dispersion and optics selected for linear temporal dispersion, said optics selected for nonlinear temporal dispersion inducing a nonlinear chirp in the probe beam, said optics selected for linear temporal dispersion spreading spectral components of a resulting chirped probe beam in time over a temporal window at least covering the entire duration of the radiation beam waveform; said linear polarizer translating the changes in the polarization state into intensity modulation of the probe beam spectrum and said detector is a real-time spectrometer.

4. The system of claim 1, wherein the system comprises pulse front tilting optics in the probe line, said pulse front tilting optics tilting the probe pulse front in space over a temporal window at least covering the entire duration of the radiation beam waveform; said linear polarizer translating the changes in the polarization state into intensity modulation of the probe beam spatial profile and said detector is a detector array.

5. The system of claim 1, wherein said laser source emits pulses of energies in a range between 0.1 and 100 nJ.

6. The system of claim 1, wherein said laser source emits pulses of energies in a range between 1 µJ and 10 mJ.

7. The system of claim 1, wherein said radiation generator generates radiation of in a frequency range between 0.1 and 230 THz.

8. The system of claim 1, wherein said laser source emits pulses shorter than 1 picosecond.

9. The system of claim 1, wherein said radiation generator generates pulses shorter than 1 picosecond of a frequency in a range between 0.1 and 10 THz.

10. The system of claim 1, wherein said radiation generator generates THz broadband pulses by one of: i) optical rectification, ii) plasma generation, and iii) photoconductive antennas.

11. The system of claim 1, wherein said radiation generator generates pulses of a frequency in a range between 10 and 230 THz.

12. The system of claim 1, wherein said radiation generator is one of: i) an optical parametric amplifier and ii) an optical parametric oscillator, and generates pulses of a frequency in a range between 10 and 230 THz.

13. A method for imaging an object, comprising:
in a laser pump line: patterning a laser pump beam with known patterns of a radiation beam and illuminating the object with the radiation beam; yielding a patterned pump beam;
directing the patterned beam from the pump line and a laser probe beam from a laser probe line to a detection crystal;
single-shot detection of the radiation beam waveform;
correlating the single-shot detection and the known patterns.

14. The method of claim 13, comprising:
dividing pulses emitted by a laser source into the pump beam and the probe beam;
in the pump line, generating the radiation beam and modulating the radiation beam in at least one of: amplitude and phase by the known patterns;
focusing the patterned pump beam from the pump line and the probe beam from the probe line to said detection crystal, the probe beam sampling in the detection crystal
different points in time of the radiation beam electric field waveform, each probe pulse spectral component or point along the spatial profile of the probe beam changing a polarization state thereof as a function of the strength of the radiation beam electric field;
translating the changes in the polarization state into an intensity modulation of the probe beam;
reading the intensity modulation of the probe beam in real-time; and
reconstructing an image of the object from the known patterns and corresponding readings.

15. The method of claim 13, comprising:
in the probe line, spreading spectral components of the probe beam in time over a temporal window at least covering an entire duration of the radiation beam waveform;
said translating the changes in the polarization state into the intensity modulation of the probe beam comprising translating the changes in the polarization state into the intensity modulation of the probe beam spectrum; and
said reading the intensity modulation of the probe beam in real-time comprising detecting the intensity modulation of the probe beam spectrum.

16. The method of claim 13, comprising:
in the probe line, tilting the probe pulse front in space over a temporal window at least covering an entire duration of the radiation beam waveform;
said translating the changes in the polarization state into the intensity modulation of the probe beam comprising translating the changes in the polarization state into the intensity modulation of the probe beam spatial profile; and said reading the intensity modulation of the probe beam in real-time comprising detecting the intensity modulation of the probe beam profile.

17. The method of claim 13, wherein the laser source emits pulses shorter than 1 picosecond.

18. The method of claim 13, wherein the laser source emits pulses of energies in a range between 0.1 and 100 nJ.

19. The method of claim 13, wherein the laser source emits pulses of energies in a range between 1 µJ and 10 mJ.

20. The method of claim 13, wherein the radiation beam has a frequency in a range between 0.1 and 230 THz.

* * * * *